G. H. LAUB.
MILL FOR CRUSHING SUGAR CANE.

No. 40,938. Patented Dec. 15, 1863.

UNITED STATES PATENT OFFICE.

G. H. LAUB, OF MACOMB, ILLINOIS.

IMPROVEMENT IN MILLS FOR CRUSHING SUGAR-CANE.

Specification forming part of Letters Patent No. 40,938, dated December 15, 1863.

*To all whom it may concern:*

Be it known that I, G. H. LAUB, of Macomb, in the county of McDonough and State of Illinois, have invented a new an Improved Mill for Crushing Sugar-Cane; and I do hereby declare that the following is a full, clear, and exact description of the same, reference being had to the accompanying drawings, making a part of this specification, in which—

Figure 1:
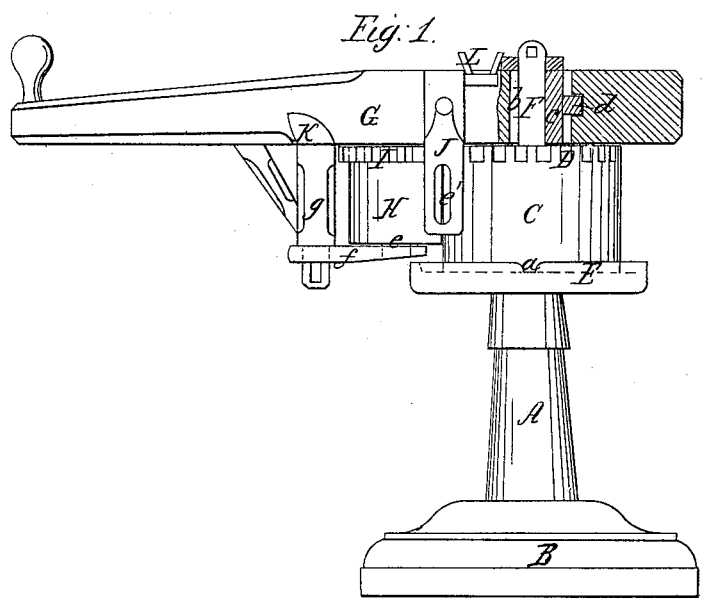
Figure 2:
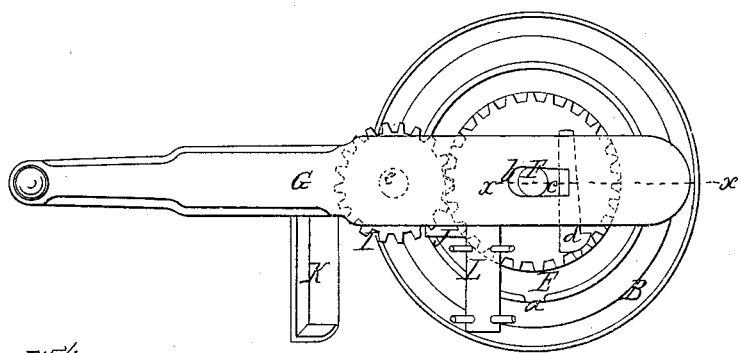

Figure 1 is a side elevation of my invention, partly in section, as indicated by the line $xx$, Fig. 2; Fig. 2, a plan or top view of the same.

Similar letters of reference indicate corresponding parts in the two figures.

To enable those skilled in the art to fully understand and construct my invention, I will proceed to describe it.

A represents an upright, which may be attached to a suitable base, B, or firmly driven into the earth. This upright may be of wood, and on its upper end there is secured a cast-iron cylinder, C, the upper end of which is provided with a sunken gear, D, and the lower end provided with an annular trough, E, having a spout or discharge-opening, $a$. The cylinder C has an upright journal, F, at the center of its upper end, and on this journal a sweep, G, is fitted, the journal passing through an oblong slot, $b$, in the sweep having a bush, $c$, in it, which is adjusted in close contact with the journal F by means of a transverse key or wedge, $d$.

To the sweep G there is attached a cast-iron roller, H. This roller H is at the under side of the sweep G, and it works on an axis, $e$, which depends from the sweep, and is stepped in a bridge-tree, $f$, which is attached to the lower end of a pendant, $g$, as shown clearly in Fig. 1. At the upper end of the roller H there it a toothed wheel, I, which gears into the sunken gear D at the upper end of the cylinder C, the latter being stationary. The periphery of the roller H is brought in close contact with the cylinder C, or as near thereto as desired, by means of the key or wedge $d$, the oblong slot $b$ admitting of a requisite adjustment of the sweep G for that purpose.

To the sweep G there is attached a pendant, J, which has a vertical slot, $e'$, made in it, said slot being in line with the "bite" of the roller H and cylinder. To the sweep there is also attached a seat, K, and a rack, L, for holding the cane to be crushed, the latter being a horizontal board with inclined rods $a'$ attached.

The operation is as follows: A horse or other draft-animal is attached to the outer end of the sweep G, and the latter is rotated, and the roller H carried around the cylinder C, the rotation of the former being insured by the gearing D I. The attendant from his seat K passes the cane through the slot $e'$ of the pendant J, said slot serving as a guide to direct the cane to the bite of the roller and cylinder, the cane being crushed between the two, and the juice falling into the annular trough E, from which it escapes through the spout or opening $a$ into any proper receptacle prepared to receive it.

The device is extremely simple and efficient, and operates well, there being no parts liable to get out of repair or become deranged by use.

I do not claim the cylinder C, provided with the trough E, and arranged with the roller H and sweep G, having the seat K and rack L attached, for these parts have been previously used; but,

Having thus described my invention, what I claim as new, and desire to secure by Letters Patent, is—

The pendant J, attached to the sweep G, and provided with the vertical slot $e$, when used in connection with the stationary cylinder C and roller H, as and for the purpose set forth.

G. H. LAUB.

Witnesses:
ALEX. MCLEAN,
J. W. ATKINSON.